(12) United States Patent
Mullen

(10) Patent No.: US 12,050,090 B2
(45) Date of Patent: *Jul. 30, 2024

(54) ADVANCED COOPERATIVE DEFENSIVE MILITARY TACTICS, ARMOR, AND SYSTEMS

(71) Applicant: Jeffrey David Mullen, Pittsburgh, PA (US)

(72) Inventor: Jeffrey David Mullen, Pittsburgh, PA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/579,554

(22) Filed: Jan. 19, 2022

(65) Prior Publication Data
US 2022/0325985 A1 Oct. 13, 2022

Related U.S. Application Data

(63) Continuation of application No. 16/172,623, filed on Oct. 26, 2018, now Pat. No. 11,262,169, which is a continuation of application No. 14/642,240, filed on Mar. 9, 2015, now Pat. No. 10,139,202, which is a continuation of application No. 13/763,700, filed on Feb. 10, 2013, now Pat. No. 8,976,023, which is a continuation of application No. 13/021,710, filed on Feb. 4, 2011, now Pat. No. 8,395,499, which is a continuation of application No. 12/558,566, filed on Sep. 13, 2009, now Pat. No. 8,058,990, which is a continuation of application No. 11/101,782, filed on Apr. 7, 2005, now Pat. No. 7,609,156.

(Continued)

(51) Int. Cl.
*G08B 1/08* (2006.01)
*F41G 3/14* (2006.01)
*F41H 1/02* (2006.01)
*F41H 7/00* (2006.01)
*G01M 17/00* (2006.01)
*G05D 1/00* (2006.01)

(52) U.S. Cl.
CPC ............. *F41H 7/005* (2013.01); *F41G 3/147* (2013.01); *F41H 1/02* (2013.01); *G01M 17/00* (2013.01); *G05D 1/00* (2013.01); *G05D 1/0278* (2013.01); *G05D 1/0295* (2013.01)

(58) Field of Classification Search
CPC ............ F41H 7/005; F41H 1/02; F41G 3/147; G01M 17/00; G05D 1/00; G05D 1/0278; G05D 1/0295; G05D 2201/0209
See application file for complete search history.

(56) References Cited

U.S. PATENT DOCUMENTS 5,995,883 A * 11/1999 Nishikado ............... G01S 17/08
 701/25
6,038,501 A * 3/2000 Kawakami ........... G05D 1/0272
 701/466

(Continued)

*Primary Examiner* — Toan N Pham

(57) ABSTRACT

This invention provides impact detection and vehicle cooperation to achieve particular goals and determine particular threat levels. For example, an impact/penetration sensing device may be provided on a soldier's clothing such that when this clothing is impacted/penetrated (e.g., penetrated to a particular extent) a medical unit (e.g., a doctor or medical chopper) may be autonomously, and immediately, provided with the soldiers location (e.g., via a GPS device on the soldier) and status (e.g., right lung may be punctured by small-arms fire).

18 Claims, 7 Drawing Sheets

Related U.S. Application Data

(60) Provisional application No. 60/560,435, filed on Apr. 7, 2004.

(56) References Cited

U.S. PATENT DOCUMENTS

| | | | |
|---|---|---|---|
| 6,529,806 B1 * | 3/2003 | Licht .................... | G05D 1/0227 700/250 |
| 7,647,144 B2 * | 1/2010 | Haegermarck ...... | G05D 1/0227 15/340.1 |
| 2004/0143930 A1 * | 7/2004 | Haegermarck ...... | G05D 1/0227 15/358 |
| 2019/0028243 A1 * | 1/2019 | Kim .................... | H04L 27/2655 |

* cited by examiner

ADVANCED COOPERATIVE DEFENSIVE MILITARY TACTICS, ARMOR, AND SYSTEMS

CROSS-REFERENCE TO RELATED APPLICATION

This application is a continuation of Ser. No. 16/172,623, filed on Oct. 26, 2018, which is a continuation of Ser. No. 14/642,240, filed on Mar. 9, 2015, which is a continuation of U.S. patent application Ser. No. 13/763,700, filed on Feb. 10, 2013, which is a continuation of U.S. patent application Ser. No. 13/021,710, filed on Feb. 4, 2011, which is a continuation of U.S. patent application Ser. No. 12/558,566 filed on Sep. 13, 2009, which is a continuation of patent application Ser. No. 11/101,782 filed Apr. 7, 2005 and now U.S. Pat. No. 7,609,156, which claims the benefit of U.S. Provisional Patent No. 60/560,435 filed on Apr. 7, 2004 and entitled "Advanced Cooperative Defensive Military Tactics, Armor, and Systems," which are all hereby incorporated by reference herein in their entirety.

BACKGROUND OF THE INVENTION

The U.S. military is getting ready to revolutionize its force—with robots. Currently, such robots only have minimal functionality. However, there is a tremendous need for autonomous military vehicles with enhanced functionality. It is therefore desirable to construct autonomous military vehicles with improved functionality. Accordingly, it is also desirable to integrate such enhanced systems and methods into commercial applications.

SUMMARY OF THE INVENTION

An autonomous military vehicle (e.g., a land-based, water-based, air-based, or space-based vehicle) is provided that is operable to defend, for example, a package (e.g., a location, person, or vehicle). In one embodiment, a location (e.g., a Global Positioning System (GPS) signal) is provided to the defensive vehicle. Such a GPS signal may change over time (e.g., a person walking with a GPS receiver may communicate this GPS signal to the defensive vehicle at a delivery rate). The defensive vehicle may then protect the package from attack. The defensive vehicle may be provided with different behaviors dependent on a situation or action event. For example, the defensive vehicle may be in a "follow and shield" behavior until the package, a different vehicle, or the defensive vehicle is attacked. At this point, the behavior of the defensive vehicle may change to, for example, a "counter-offensive", "shield and escape", or "protect and defend" behavior.

Numerous methods of sensing an attack are provided. For example, impact-sensing armor, or clothing, may be provided. Such armor, or clothing, may determine, for example, when a hit occurs, the direction the attack came from, the trajectory used, and the type of attack (e.g., a 10 mm gunshot). Such an attack sensing scheme is extremely effective because only in rare circumstances will this type of sensing fail (e.g., friendly fire). However, if a defensive vehicle is in a "shield" mode, even friendly fire may not cause any harm as the defensive vehicle may shield the package from the friendly fire without causing harm to the origin of the friendly fire. Other types of attack sensing include a scheme with one or more methods of, for example, heat sensing, motion sensing, residue sensing, and sound sensing.

Impact-sensing schemes of the present invention may be utilized in numerous useful applications. For example, a sheet of supplemental armor may be stored in a vehicle and deployed to a particular portion of the vehicle if an impact occurs. In this manner, the vehicle may have at least some of the benefits of a heavy-armored vehicle (e.g., ability to take multiple hits) while simultaneously having at least some of the benefits of a light-armored vehicle (e.g., higher mobility). As in another application, if an autonomous vehicle determines that it is damaged on one side then the autonomous vehicle may show its aggressor an undamaged size. Putting this application into perspective, suppose that the vehicle is an autonomous armored personnel carrier. If a rocket propelled grenade damages one side of the autonomous vehicle traveling in one direction, the vehicle may sense this impact, turn 180 degrees (e.g., turn around and drive in reverse), and continue driving in that same direction. Yet, now the undamaged side of the vehicle is facing the direction of attack. Circuitry, such as memory and a processor) may be included in the vehicle (and coupled to the impact sensors) to keep track of damage to the vehicle such that the vehicle may autonomously make decisions on this information.

Similarly, impact sensing clothing may be utilized in a number of applications. For example, an impact sensing system may be provided in a bullet proof vest and this information may be shared with defensive/offensive vehicles such that an impact on the bullet proof vest changes the behavior of the defensive/offensive vehicles. This information may also be utilized by other sources such as, for example, ground commanders, other soldiers, or manned vehicles (e.g., fighter jets).

Without bullet-proofing in clothing, impact sensing clothing may play a vital role in saving the lives of priceless soldiers. The instant a bullet hits impact-sensing clothing, a signal may be sent to, for example, a medical center, ground commander, nearby soldiers, medical vehicles (e.g., choppers) that is indicative of vitals information such as, for example, the soldier's name, weight, height, allergies, impact area, impact type, impact speed, and location of impact. Software may be provided that automatically prioritizes wounded soldiers for pickup/aid.

The defensive vehicles of the present invention may be used to have one or more offensive, or any other kind, of behaviors. Such autonomous vehicles may be miniaturized and attached onto other vehicles. For example, a number (e.g., 4) of defensive vehicles may be attached to a tank or personnel carrier. If the tank comes under small arms fire, one or more of the defensive vehicles may "eject," or be "ejected", from the tank and attack in the direction of the origin of the small-arms fire while the tank uses this ejected vehicles aggression as cover aggression (e.g., cover fire) to maneuver and escape.

A gun firing a projectile may be sensed as the gun is fired or as the projectile moves through a monitored portion of a three-dimensional space (e.g., the space in front of a person). The projectile may be distinguished from other movement based on the velocity of the projectile (or a variety of other methods). A shield may then be deployed before the bullet hits a target.

A smart missile is also provided and may be used, for example, as a defensive/offensive counter-measure during an attack of a predetermined package (e.g., a troop transport). Such a defensive missile (or other projectile) may be relatively large—similar in size, for example, to a Predator autonomous aircraft. Missile attacks from battleships take relatively long times to program, initiate, and hit a programmed target (e.g., 30 minutes). An enlarged missile may carry extra fuel. The missile may alternatively carry an engine. Such a missile could be programmed to fly in a pre-determined path (e.g., a loop) above or near a battlefield or selected targets. Thus, when a target is chosen, the smart missile may already be en-route to the target (or at least at a shorter route away from the target than a carrier, or ground, based missile).

Such a weapon could have been especially useful during the 2003 Iraqi war. Here, President Saddam Hussein was allegedly determined to be in a particular area. A ship-based missile allegedly took 30 minutes to program, launch, route, and travel before the missile hit the target. By this time, Saddam Hussein had allegedly left the scene. The reduction of command-to-result time is critical (the time it takes for a command to be carrier out).

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
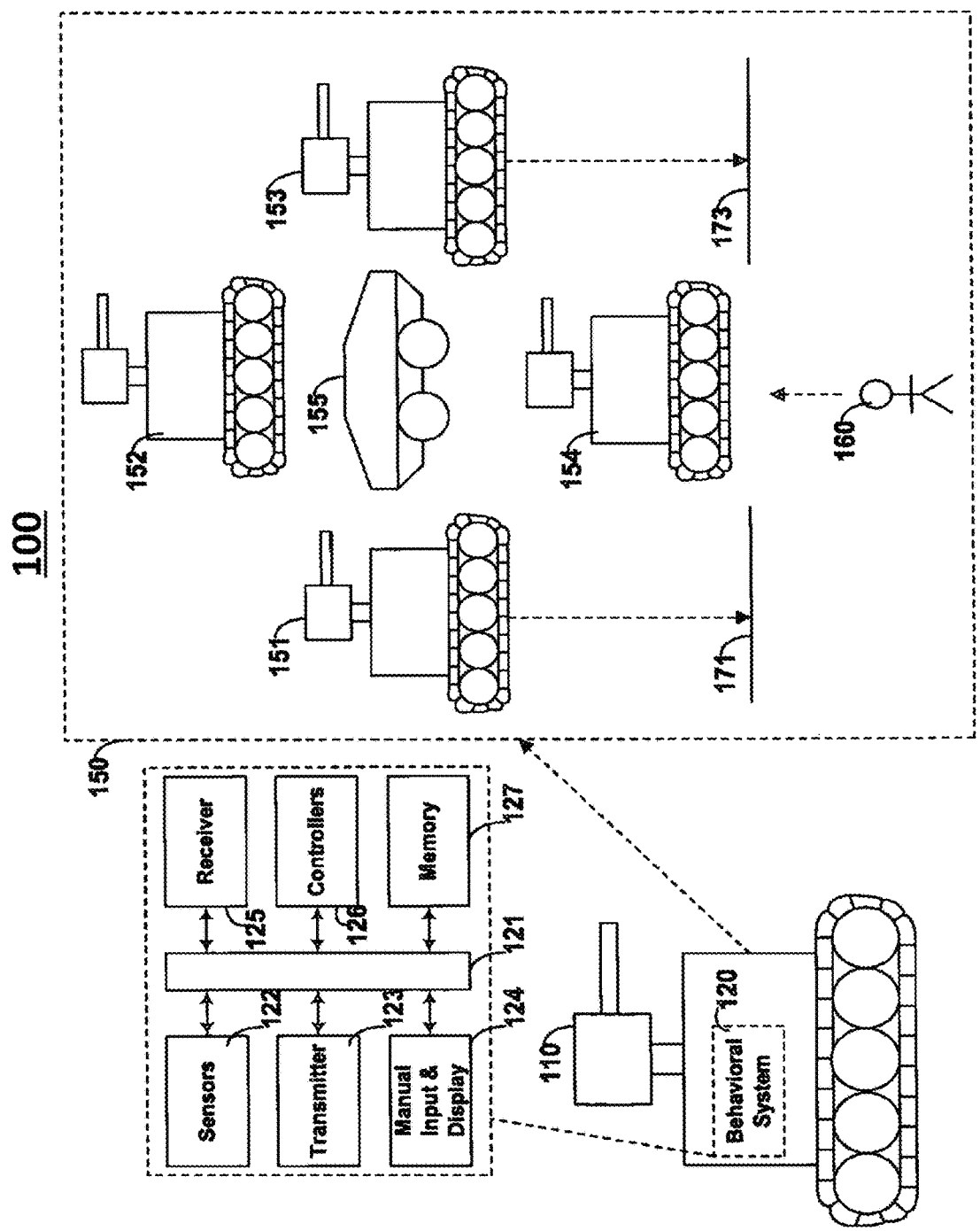
FIG. 1 is an illustration of a defensive tactics topology constructed in accordance with the principles of the present invention.

FIG. 1 shows tactics topology 100 that includes autonomous vehicle 110. Autonomous vehicle 110 may be configured to protect a person, vehicle, group of people, group of vehicles, or a location (e.g., a specific location or an area). Autonomous vehicle 110 may also be configured to protect itself or a portion of itself (e.g., sensitive components like a gas tank or passenger compartment). Thus, autonomous vehicle 110 may be configured to protect package 144. Accordingly, package 144 may be one or more objects, persons, or locations that are desired to be protected. Multiple autonomous vehicles 110 may be provided in communication with each other to one of these autonomous vehicles, work together to protect this group of autonomous vehicles, or protect one or more packages such as package 144.

Each autonomous vehicle may include circuitry (e.g., a behavioral system) for receiving, processing, storing, and communicating behavioral data. The behaviors of one or more autonomous vehicles may change based on such behavioral data. For example, the behavior of an autonomous vehicle my be changed from a behavior such as a defensive posture (e.g., a guard) to an offensive posture (e.g., an attacker) to a fleeing postured (e.g., an escapist) to a suicide offensive posture (e.g., a suicide bomber) based on such behavioral data.

Behavioral data may be derived from a variety of data originating from a variety of sensors. Each such data may be utilized by a behavioral system to change the behavior of the device, object, or person that houses, or is in communication with, the behavioral system. For example, weather data may originate from a temperature sensor (e.g., thermometer producing electrical signals) precipitation/humidity sensor, light sensor (e.g., photodiode or phototransistor), and/or wind sensor in communication with, or provided in, a behavioral system. This data may, for example, be utilized (e.g., weighed) in a function that outputs (e.g., based on if a threshold is met) behavior data. Using the data previously described, the amount of light may be utilized when to attack (e.g., at night) and when to stay defensive (e.g., during the day). Alternatively, the amount of light may be utilized to determine where to plan an approach on an offensive target (e.g., by following the shadows) or where to protect a target (e.g., where to hide a target). Precipitation data may be utilized, for example, in a similar manner such as light data to determine when to attack (e.g., when it is or is not raining). Temperature data may be utilized in a variety of ways and serve, for examples, as indicators of nearby explosions and shaded/unshaded areas that are used by a behavioral system. A wind sensor may also be utilized to determine behavior and be provided as a data input to a behavior system. Wind, for example, may provide a behavior system with information as to how air-based backup would operate (to determine if to hold a position and wait for the air-based attack or retreat). A wind detector could also be utilized to determine nearby explosions.

Numerous types of sensors may be employed. Time data may originate from a clock in communication with, or provided in, a behavioral system may be utilized to sync signals, execute commands in unison with other behavioral systems, or determine the time of day. Time data may also be utilized to derive behaviors of, for example, aggressors. For example, an autonomous vehicle may "pick up" on a pattern of attacks from aggressors at a particular time of day (similar to how directional data may be utilized to determine a common direction that attacks are originating from). Thus, a person or object may use this derived behavioral data of unknown persons or objects to determine either a general behavior or a behavior towards a specific, or a group of, unknown persons. Thus, if attacks are occurring every hour on the hour (or a particular hour of the day) the person or object (e.g., an autonomous vehicle) may "pick up" on this pattern and react accordingly (e.g., move to a different location before the attack begins to have an improved defensive or offensive position).

Behaviors of an autonomous vehicle may be configured to differ depending on the type of person, type of vehicle, group of vehicles and/or persons, in its proximity (which could be far if the person/vehicle could affect a battle or offensive/defensive movement from a far distance). Thus, the behavioral system may include a database, in which behavior profiles may be set up for any pre-known, or sensed, entity. Such third party behavioral profiles may be utilized with data sensed by the system (e.g., time data, impact data, nearby friendly entity behavior data) to modify its own behavior in general (or to the entity associated with that third party behavior profile), update the behavior profile of the third party, or update behavioral data (e.g., for both the third party and the autonomous vehicle) on other friendly behavioral systems it is in communication with.

As stated, multiple autonomous vehicles may be employed. For example, autonomous vehicles 151-154 may be programmed to each "shield" vehicle 155 from a particular "line-of-sight" (e.g., in a particular direction). Autonomous vehicles 151-154 may communicate with package 155 by, for example, obtaining positioning data (e.g., GPS positioning data) from package 155 and providing package 155 with data on how to operate (e.g., package 155 may be told to "STOP" or "RUN" when package 155 is under attack). Similarly, package 155 may provide autonomous vehicles 151-154 with data on how to operate. Package 155 may also obtain data (e.g., positioning data) from autonomous vehicles 151-154. Such communicated, or relied upon, data may be direct commands/decisions (e.g., "RUN," "STOP," "TURN," "SLOWLY APPROACH," or "FIRE") or information utilized to generate direct commands/decisions (e.g., behavioral data).

Autonomous vehicles 151-154 do not necessarily have to be autonomous. Any function (e.g., driving) may be manually operated at any time or during a particular threat level (e.g., an attack on one side or an attack on multiple/all sides). Package 155 may be, for example, a person (e.g., the president), land-based vehicle (e.g., a personnel carrier), water-based vehicle (e.g., a boat), space-based vehicle (e.g., a satellite), or air-based vehicle (e.g., a missile, plane, or helicopter).

Vehicles 151-154 and package 155 may autonomously drive in a particular formation during a particular threat level for the U.S. (e.g., DEFCON 2), threat level for an enemy entity (e.g., enemy platoon), or threat level for a particular event (e.g., the threat level to trigger a defensive posture may be different when attacking versus when traveling). Threat levels may, for example, be thresholds that determine the behavior of an entity. For example, during an attack, small-arms fire may be associated to a number (e.g., 10) while more aggressive fire such as rocket propelled grenades are associated a higher, or different number, (e.g., 20). Two threat levels separated by a number between these two (e.g., 15) may cause the entity to operate differently dependent on if it is being attacked, or has the possibility of being attacked, by small-arms fire versus rocket propelled grenade fire.

Damage and/or impact information for vehicles 151-154 and package 155 may be shared by one another. For example, vehicle 153 may update its damage, hit, location, status, behavior, or other information on memory devices stored on vehicles 151-152, 154, and package 155 periodically (e.g., every 5 seconds), continuously, or when an event occurs (e.g., when damage occurs or when a driving hazard is faced). Vehicles 151-154 and package 155 may be programmed to respond to such events depending on, for example, the event.

For example, if threat 160 is sensed (e.g., threat 160 shoots a projectile that is detected, impacts, and/or damages vehicle 151-154 or package 155) then one or more vehicles 151-154 or package 155 may autonomously respond to threat 160. For example, vehicles close to threat 160 may shield package 155 from threat 160 and attack threat 160. Furthering this example, vehicles 151 and 153 may be autonomously driven to (or prompted to be manually driven to) locations 171 and 173, respectively, where vehicles 151, 153, and 154 may attack threat 160. Furthering this example even more, the speed of vehicle 152 and package 155 may be increased and the direction of vehicle 152 and 155 may be changed if threat 160 is only determined to be from a particular direction. Persons skilled in the art will appreciate that numerous response techniques may be provided to one or more threat in accordance with the principles of the present invention.

As stated above, a behavioral system, such as behavioral system 120, may communicate with an entity or be included in/on an entity. For example, behavioral system 120 may be housed (e.g., protected inside of and control the autonomous operation of vehicle 120). Behavioral system may include, for example, any type of sensor 122, transmitter 123, manual input and/or display 124, processor 121, receiver 125, controllers 126, and memory 127.

Sensors 122 may be any type of sensor including, for example, directional sensors, altitude sensors, inertial sensors, location sensors (e.g., GPS receiver), temperature/heat sensors, light sensors, feedback sensors from components of the host entity (e.g., feedback information from guns, engines, wheels), impact and damage sensors, entity detection sensors such as radar, metal sensors (e.g., electromagnetic field generators that sense types of metals and Radio Frequency Identification (RFID) sensors), precipitation sensors, time sensors, noise sensors, speech recognition sensors, spectrometers, motion sensors (e.g., sensors that may detect the motion of a bullet in its surroundings), or any other type of sensors.

A bullet recognition sensor may comprise, for example, a digital movie camera (or a digital camera) with a high shutter speed (e.g., 10,000 fps). The images from such a digital camera may be fed through a computer (e.g., a processor), since the speeds of and sizes of different types of projectiles are known, the images can be compared and the differences noted. At such a high shutter speed, normal movements may appear nearly motionless. Thus, the image processing may not be a demanding process. Substantial differences may be very easy to spot and these differences can be compared in, for example, size, shape, and/or speed to determine the type of projectile. Moving the camera slightly during operation may provide a better perspective of where the projectile originated from, its trajectory, where the projectile will impact, and the type of damage that may be done (types of projectiles and related information such as velocity, size, and weight may be stored in memory, such as placed in a database, and may be retrieved/pulled by (or transmitted/pushed to) the sensor or behavioral system 120). The sensor may be in a continual loop, placing images in a buffer, analyzing the images that define a period of time, and then erasing those images. The sensor may be initiated when an impact is sensed in order to determine trajectory and may operate until a period of time without activity, such as an impact or hostile or unusual event, occurs (such an embodiment may conserve power). Such images may transmitted (e.g., immediately after the images are taken) to a different entity or a remote processing facility. Such transmitted images may be saved indefinitely and processed if, for example, the transmitting entity is destroyed before local processing occurs. Additionally, the results of image processing for the purpose of very-fast-movement (VFM) detection may be sent to other entities after the results are processed.

One or more transmitters, e.g., transmitter 123, may be coupled to processor 121 and/or the components of behavioral system 120 or the components of vehicle 110. Such transmitters may include wireless transmitters and wire-based transmitters. Vehicle 110 may also be, for example, a backpack or a backpack, impact/damage bulletproof vest system or a backpack, impact/damage sensing clothing system.

Manual input (e.g., a keyboard or mouse) and/or manual outputs (e.g., a display) may be coupled to behavioral system 120 or vehicle 110. Such manual inputs/outputs may be, for example, utilized for manual override of vehicle 110. Such manual inputs may be included inside of vehicle 110 (such that a passenger, gunner, or driver may take control of vehicle 110 operations) or external to vehicle 110 (e.g., in a command facility).

Receiver 125 may be included and may be a wire-based receiver or a wireless receiver. Signals may be transmitted through voice-over-internet, data-over-internet (e.g., via the internet), wireless USB, wireless LAN, radio signals, satellite communications, cellular communications, WiFi, or any other wireless or land-based communication system.

Controllers 126 may be included for a variety of applications. For example, controllers 126 may be sent signals, and provide feedback to, processor 121. Controller 126 may include a controlled device. Thus, controller 126 may be, for example, a controller and actuator. The actuator may be coupled to other components of vehicle 110 such as, for example, a gun. The controller then may, following the example, manipulate the direction that the gun is pointing. The component being controlled (either directly or indirectly) may also contain a variety of sensors and may provide feedback from these sensors to the controller or provide feedback directly. Such feedback may then be provide to processor 121. Using the example of the gun, feedback may be a confirmation of the direction that the gun is pointed in (such that the processor is not burdened with calculating the direction the gun is pointed in but is provided the direction by a sensor located on the gun and coupled to the controller). Following the example even more, the firing device for the gun may be coupled to this, or a different controller and feedback information may include, for example, the status of the gun (e.g., the heat and number of bullets left). All of this information may be utilized to determine the best behavior of vehicle 110 or other entities such as vehicles 151-154 (e.g., the behavior most likely to achieve a desired goal).

Memory 127 may be also included in vehicle 110 (or any other entity of topology 100). Memory 127 may house numerous data structures (e.g., databases) and associated applications (e.g., database manipulation software) which may be called, utilized, and modified by processor 121.

Figure 2:
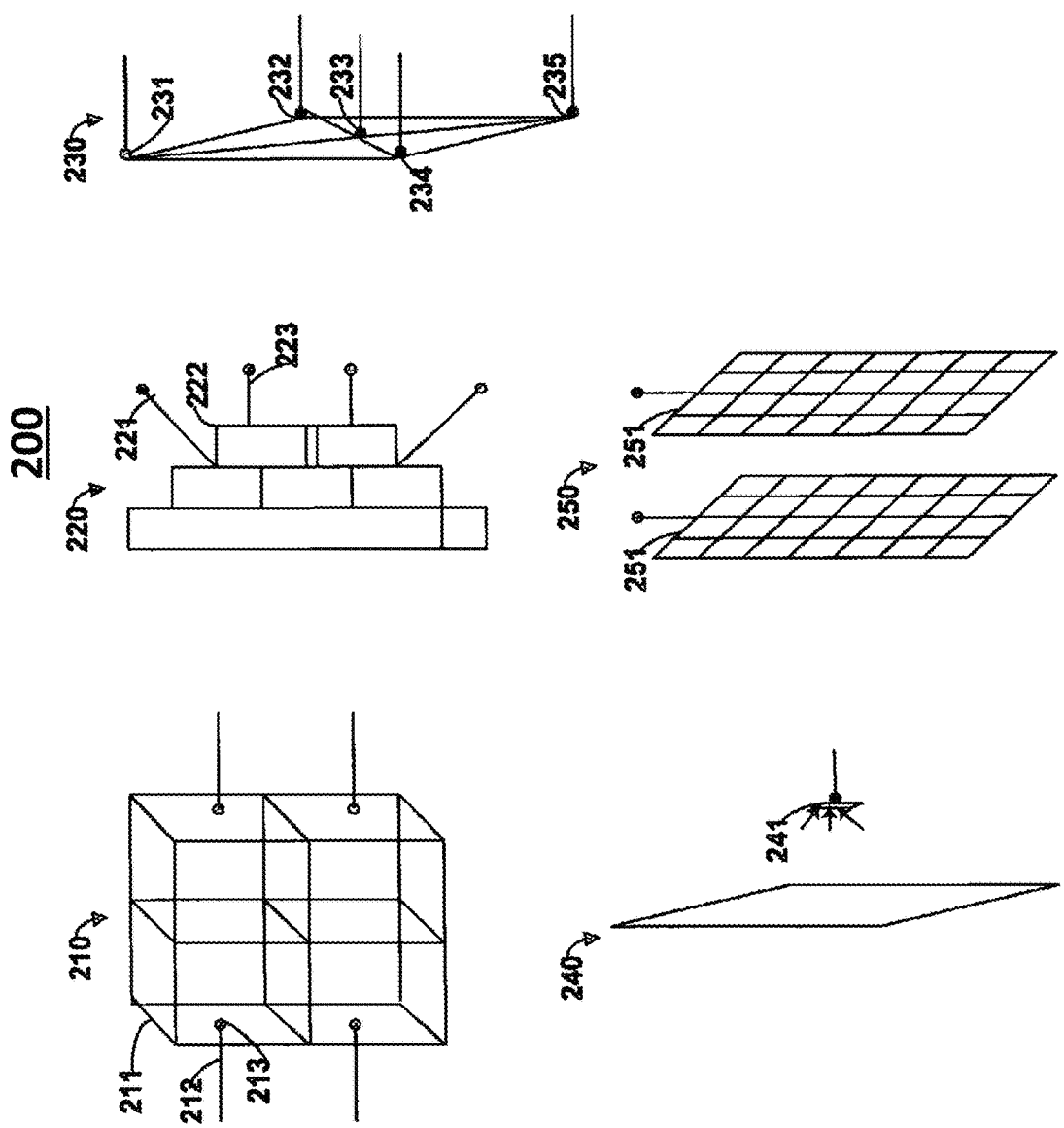
FIG. 2 is an illustration of an improved armor system constructed in accordance with the principles of the present invention.

FIG. 2 shows armor impact and/or damage detection systems 200 that may, for example, detect when a projectile strikes and/or damages a piece of armor on a vehicle (e.g., vehicles 151-154 of FIG. 1), packages (e.g., package 155 of FIG. 1), or a component of a vehicle (e.g., fuel tank, engine, or behavioral system) or package. Any one of the systems 200 may be used as armor or may form one or more layers on or between armor layers or other or may form part of a material on a vehicle or package.

System 210 may include any number of portions 211 (e.g., cubes) that may house a substance (e.g., water or air). Pressure sensors, for example, may detect when the substance is disturbed (e.g., leaks out of the housing) inside of one or more portions 211 to determine if an impact or damage occurs. In overlying system 210 over the interior or exterior of a material (e.g., an armor) an inexpensive way of determining damage and/or impacts is provided. Changing the strength of portions 211 may change the functionality of system 210. For example, fabricating portions 211 out of a material that may easily by breached (e.g., a polymer such as a plastic) impacts that would not cause damage to the adjacent armor may be detected. Portions 211 may include one or more sensors 213 that are coupled to one or more wires 212. One or more wires 212 may provide power, or operating signals, to one or more sensors 213 and/or may be provided feedback signals from one or more sensors 213. Wires 212 may be coupled to, for example, a processor of a behavioral system or a controller or other system/circuit. Fabricating portions 211 on a micrometer or nanometer scale increases the visibility of damage and/or impacts such that the type of projectile may be deduced (e.g., by a microprocessor of a behavioral system) as well as its trajectory. Sensors 210 may alternatively determine whether or not a material is inside of portion 210 (e.g., if a liquid is present or if a level of a liquid is present such as if a portion is full of a liquid).

System 220 may utilize piezoelectric elements on top of armor (or immediately adjacent to any material) to detect when the armor is bent or an impact occurs that would bend the piezoelectric elements. Particularly, when the armor (e.g., the metal exterior of a car door) bends then the piezoelectric elements may produce an electrical voltage that may be sensed by sense circuitry on the vehicle (or a processor of a behavioral system). Such sense circuitry may, for example, communicate such information to other circuitry or perform functions on the information (e.g., processing circuitry to determine how much the armor bent by determining the magnitude that was sensed and the amount of time of the impact event). One or more piezoelectric element 222 may be placed on any material and sensed by sense terminals 221 and 223. It should be noted that applying a voltage to sense terminals 221 and 223 may cause piezoelectric element 222 to bend. If armor was not damaged, piezoelectric element 222 may not bend against the armor. Thus, applying a voltage to piezoelectric element 222 may test to see if armor has failed (additionally circuitry may also be utilized to determine if the piezoelectric element moves in such an embodiment).

System 230 may be utilized as, for example, an acoustic sensor. Armor may be divided into regions with sensors placed throughout. Circuitry coupled to such sensors may be able to, for example, triangulate acoustic vibrations in the armor as a result of an impact to determine the location of the impact. The size of the vibrations may be utilized to determine the magnitude of the impact. If damage occurs then the sensors (or wires connecting the sensors) may be damaged to the extent that they are inoperable (or inoperable to communicate with each other). Such information may be utilized to distinguish the difference between, for example, an impact and damage. Similar to system 210, system 230, or multiple systems 230, may be fabricated on any scale such as a micrometer or nanometer scale. Any number of sensors 231-235 may be employed in any array configuration or sets or array configurations. Sensors 231 and 235 may alternatively be utilized to sense the conductance of the material they are coupled to. The conductivity of metal may change, for example, when that metal changes shape.

System 240 may be utilized to determine, for example, when light is emitted through armor. Thus, when an impact penetrates a piece of armor, a light-sensing component may be utilized to determine that such a penetration occurred. Multiple light sensors 240 may be arrayed together and utilized to determine where damage occurs. The operation of light sensors 240 may be periodically checked to determine if they are operational (e.g. have not yet been destroyed by damages) to obtain damage information of the internals of a vehicle. Any impact/damage detection system may be utilized on any component of, for example, a vehicle or other structure.

System 250 may be utilized, for example, with one or more grids of wires in order to detect and locate an impact. For example, damage to a grid of wires may cut such wires such that electricity may not flow through one or more wires that make up the grid. Providing a current or voltage to a wire and sensing that current or voltage at the other end of a wire may be utilized to determine if that wire has been cut (e.g., by an impact). Multiple wires could be sensed in this manner in order to triangulate, or just determined, the location (and size) of damage). Multiple layers could be utilized to determine the strength of the impact (e.g., a one or more layers may be placed on the exterior of the armor while one or more layers are placed on the interior of the armor). In determining the depth of damage, and the change of the damage profile to each layer, the trajectory of the projectile may be determined (as well as the type of projectile inferred and used to affect the behavior of an autonomous vehicle). The grids of multiple layers (e.g., layers 251 and 252) may have the visibility on the nanometer or micrometer scale (e.g., the grids of the layers may be nanometer or micrometer in size). Any number of layers (e.g., hundreds) may be utilized and may be spaced in any manner (e.g., adjacent to one another or in between other materials such as pieces of Kevlar).

Persons skilled in the art will appreciate that numerous impact detecting methods may be utilized in accordance with the principles of the present invention. For example, system 220 and system 250 (or any number of schemes of FIG. 2) together on a single vehicle/person/package/structure.

Figure 3:
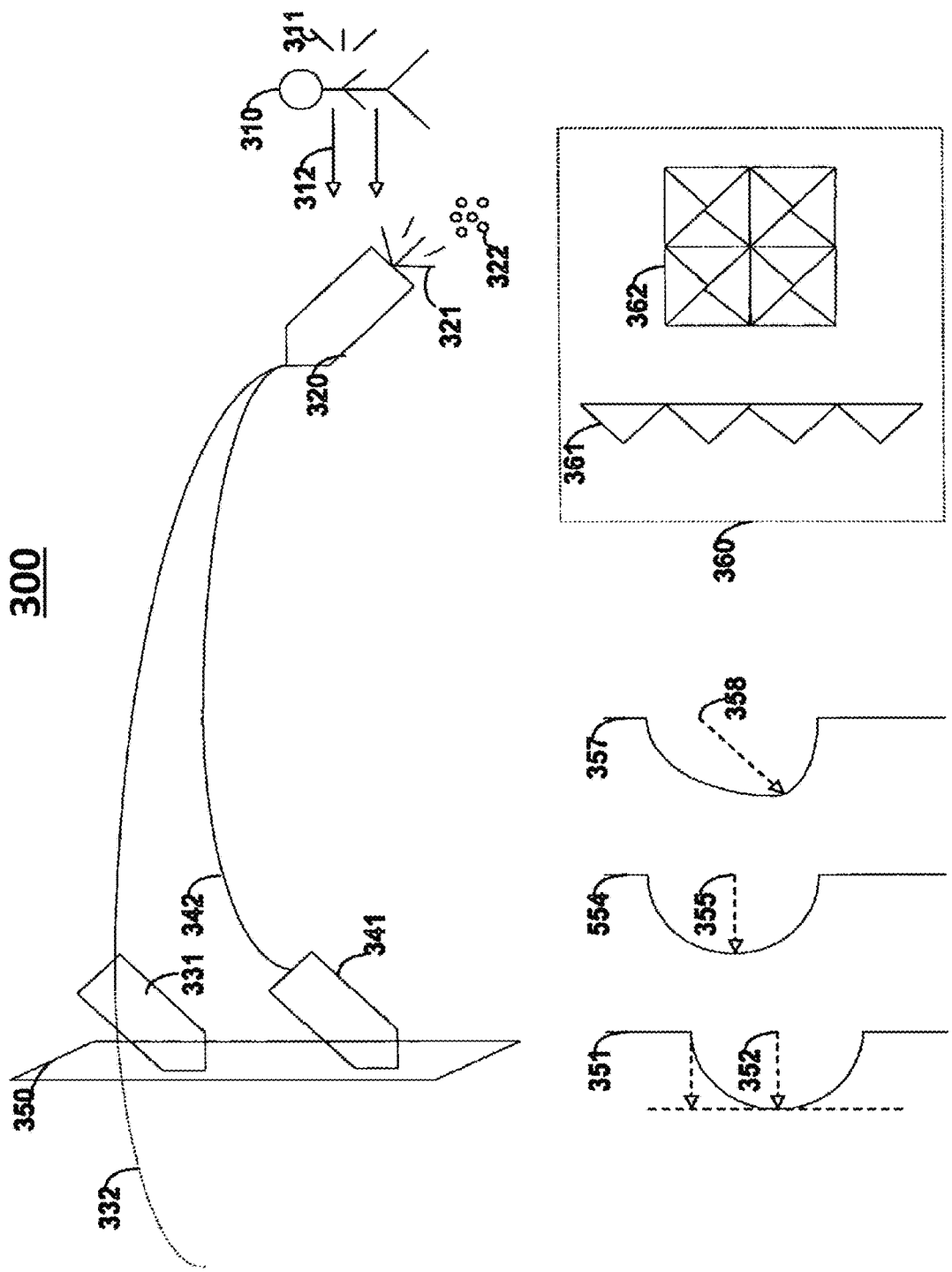
FIG. 3 is an illustration of an impact-detection system constructed in accordance with the principles of the present invention.

FIG. 3 shows impact and/or damage detection systems 300. Persons skilled in the art will appreciate that any system that detects damage also detects impacts because damage may not occur without impacts. Generally, schemes 300 may include threat detection systems. For example, threat 310 may be detected, for example, by motion 312 or heat 311. Projectile 320 may be detected by, for example, heat 321, motion, or residue 322. Projectile 320 may take on different trajectory (e.g., if it has more propellant or it has a different trajectory for a variety of reasons). For example, projectile 320 may impact armor 350 while following trajectory 332. Projectile 341, alternatively, may impact armor 350 while following trajectory 342.

An impact detection scheme may utilize the information gathered from an impact and utilize this information to determine where the threat is coming from. As in one embodiment, a vehicle may recognize an impact on a particular side as having a threat on that particular side. If multiple threats are sensed, the vehicle may determine what threat is more dangerous (and/or either autonomously respond, prompt a user of the situation, and/or communicate the situation to other vehicles/packages/remote facilities). In this manner, threats may be prioritized. Trajectory 352 may provide a impact crater that is symmetrical. This symmetry, depth, size may be sensed (e.g., from a large number of piezoelectrics located around the crater) to determine where the impact came from (e.g., close proximity), what type of projectile may have been used (e.g., small arms fire or propelled grenade), and how far away the threat may be (e.g., 50 feet). Any threat information may be utilized by a behavioral system.

For example, suppose that a vehicle is hit twice. First, the vehicle is hit by trajectory 352. Second, the vehicle is hit by trajectory 355. The vehicle (or processing on the vehicle or elsewhere) may determine with a particular probability that, for example, the same projectile was used. The change in trajectory could be determined to be the result of, for example, the position of where trajectory 355 originated from. This information could be used, for example, to automatically cause the vehicle to return fire, prompt a user (e.g., driver or gunner) with the information, or do a variety of functions. In this example, armor 351 and 354 would have been the same armor only at different times.

Suppose that a projectile strikes armor 357 at trajectory 358. As a result, the impact crater may be non-symmetrical. This non-symmetry may be sensed (e.g., by piezoceramics located around the crater) and utilized to determine probably trajectory or projectile type data. Such information may be immediately and autonomously communicated to other "formations" of autonomous or manually driven vehicles (e.g., two nearby airplanes) or a nearby commander or a headquarters.

Armor may be provided to have a non-smooth surface in order to better determine a trajectory of a projectile. For example, armor 361 or 362 may be provided with pyramid type shapes on or made out of armor. As a result of armor 361 and 362 a processing unit or impact-sensing scheme may be able to more easily be configured to aid in a trajectory or impact determination function.

Figure 4:
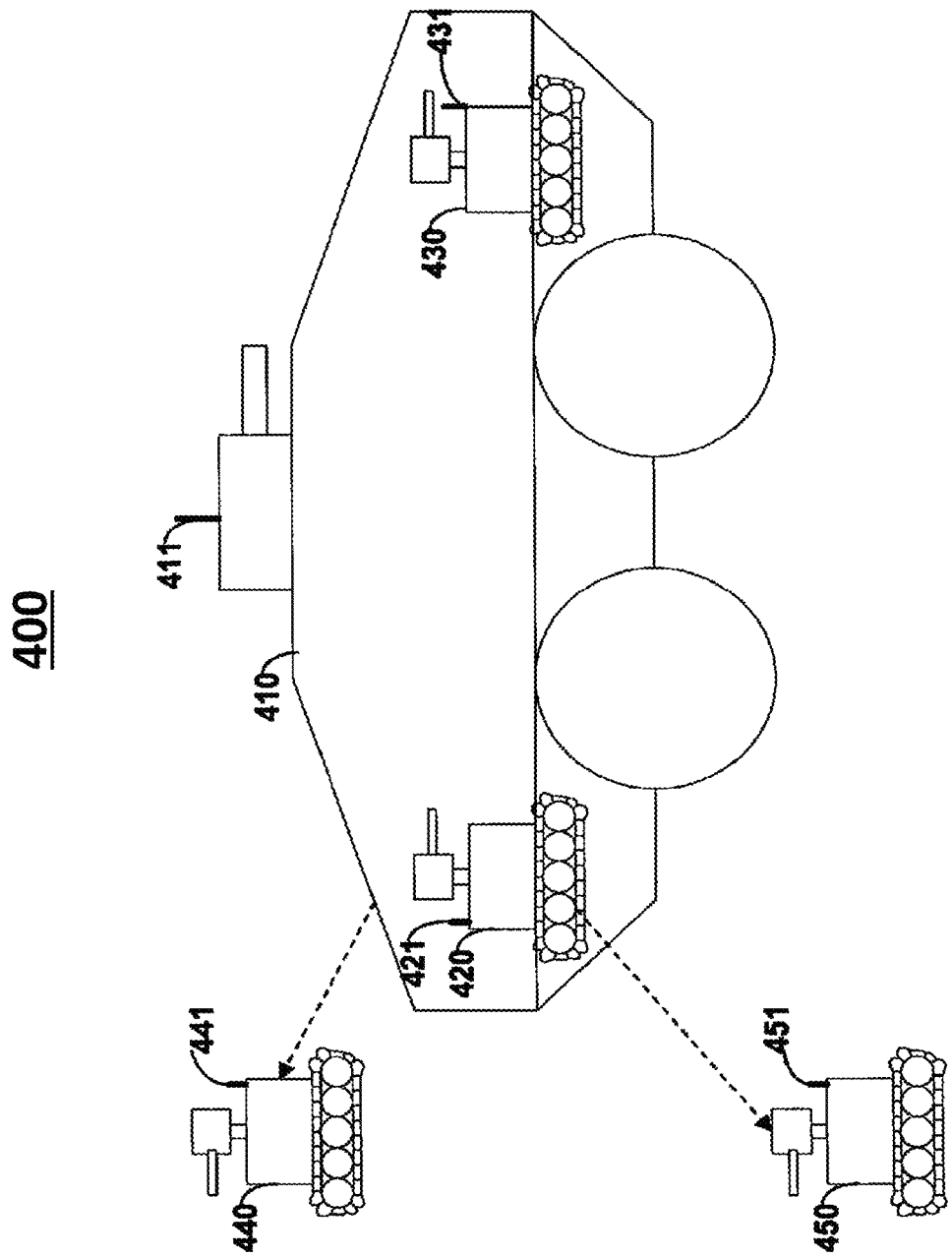
FIG. 4 is an illustration of a cooperative vehicle cluster constructed in accordance with the principles of the present invention.

FIG. 4 illustrates shows cooperative vehicle cluster 400 that includes mother vehicle 410 and children vehicles 420, 430, 440, 450 that may include communication devices 421, 431, 441, and 451, respectively, to communicate with, for example, communications device 410. The children vehicles may be stowed on a mother vehicle and released, for example, when an impact occurs or a threat is detected. Children vehicles may be in a sleeping mode or may be coupled to the power supply of the mother vehicle while, for example, in stow. Such children vehicles may be controlled autonomously from internal processing systems or a processing system on mother vehicle 410. All vehicles of FIG. 4 may communicate with other systems not shown in FIG. 4. For example, all vehicles may communicate with a central command center. In this manner, a child vehicle may be controlled by the central command center if, for example, the mother vehicle is disabled/destroyed. Persons skilled in the art will appreciate that the defensive tactics constructed in accordance with principles of the present invention may be utilized as offensive ones. For example, instead of sensing a threat, the vehicles of FIG. 4 may sense a target (or be given a target from a gunner or other system/person) and the children vehicles may be deployed to attack the target either alone or in combination with the mother vehicle.

Figure 5:
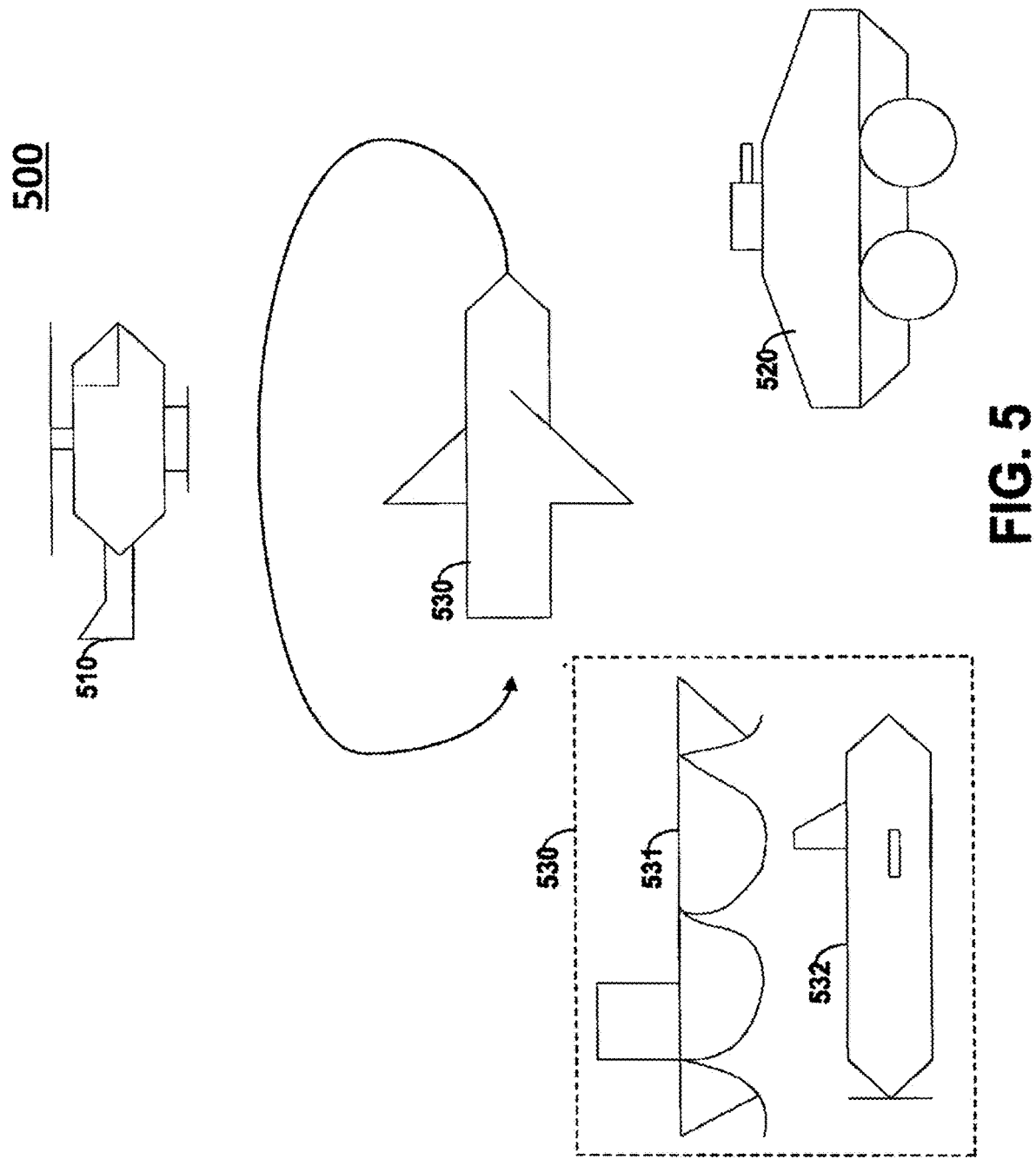
FIG. 5 is an illustration of a cooperative vehicle cluster constructed in accordance with the principles of the present invention.

FIG. 5 illustrates cooperative vehicle cluster 500 that may include, for example, missile 530, helicopter 510, submarine/torpedo 532, ship 531, or tank 520. Generally, such vehicles/persons/devices may be, for example, air-based, water-based 530, space-based, land-based or any type of vehicles/persons/devices. Any vehicle or entity of system 500 may include any number of behavioral systems.

Figure 6:
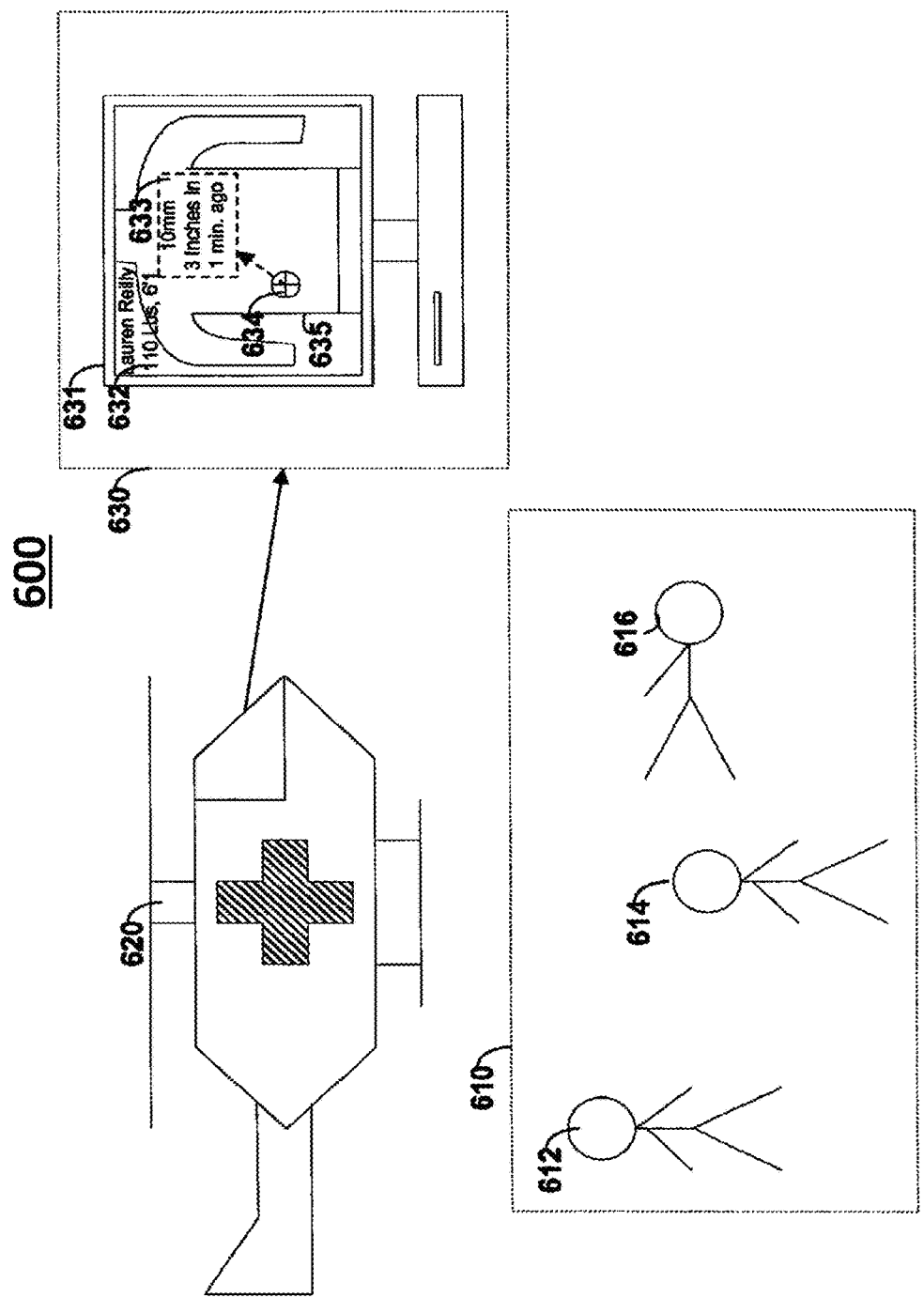
FIG. 6 is an illustration of a medical application topology constructed in accordance with the principles of the present invention.

FIG. 6 shows medical application 600 that may be utilized, for example, with people. For example, soldiers may wear clothing that detects when an impact occurs (e.g., includes a wired-grid layer or piezoelectric-based layer) and immediately notifies a medical unit/center of the impact and/or damage. Particularly, soldiers 612, 614, and 616 may be in hostile environment 610. Soldier 616 may be hit and processing circuitry (e.g., located on one or more soldiers) may determine such a hit and provide information to medical unit 620. This, or additional, processing circuitry may be utilized to determine, or retrieve from a remote database, specifics/personal information 632 of the soldier that was hit (e.g., name, age, weight, previously known medical conditions, allergies, favorite movie). The location of the impact and/or damage may also be communicated in addition to its size and probable depth. The impact may be virtualized on virtual character 635 as virtual impact 634 and virtual impact data 633. As a result, medical unit 620 may be able to better prepare for treating soldier 616 before medical unit 620 comes into contact with soldier 616. Such information may be configured to be displayed by, for example, computer 631 or may be posted on the internet or an intranet. One advantage of application 600, for example, may be that the immediate notification of an injury is autonomously communicated to a medical unit.

Any impact and/or damage information may also be forwarded to nearby friendly forces (e.g., autonomous vehicles) such that battle plans may be revised with information as to where the person was injured and where the aggressors are located and what the aggressors are attacking with. Such a system may be utilized on any assets (e.g., an expensive autonomous vehicle) such that the autonomous vehicle may be recovered (and repaired) before it is fully destroyed. Autonomous medical vehicles may be provided to service injured autonomous vehicles. Any autonomous vehicle may share the properties of, for example, a robot and be controlled partially, or at a particular time or in a particular situation, by manual input. Thus vehicles may also have input devices in the form of cameras to relay additional information to such manual users such that decisions may be made on good information about the situation the vehicle is in.

Figure 7:
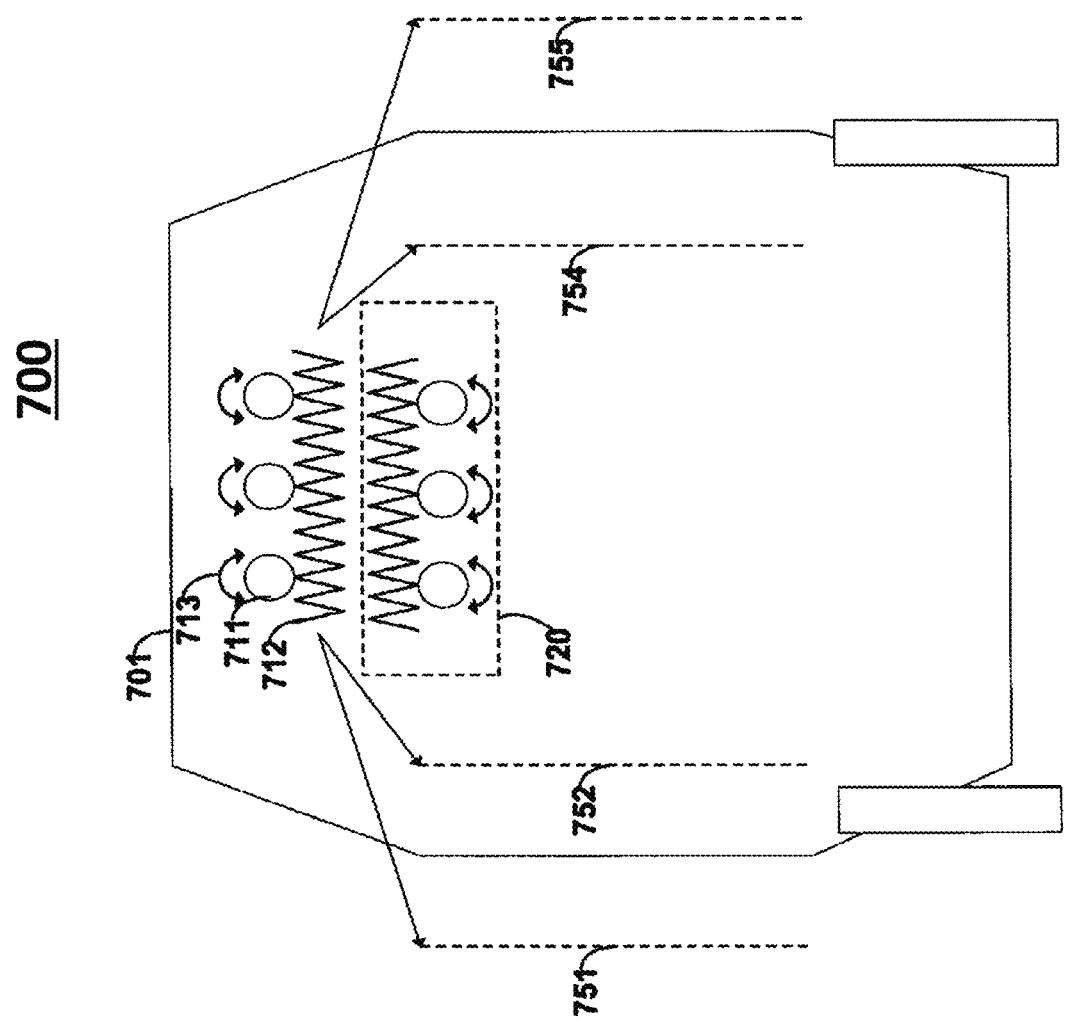
FIG. 7 is an illustration of a secondary application deployment system constructed in accordance with the principles of the present invention.

FIG. 7 illustrates secondary application deployment scheme 700 shows vehicle 701 with secondary armor 751, 752, 754, and 755. Upon detecting an impact, one or more secondary armor sections may be deployed in the area where the impact was detected by, for example, armor disbursement devices 711-712 and 720. Multiple types of secondary armors and disbursement devices may be utilized. For example, a single secondary armor may be provided on top of a vehicle. As a result, the vehicle may travel faster than a vehicle with such secondary armor already deployed on more than one side. When the vehicle is hit, or a threat is sensed, the armor may be placed in the direction of the threat or location of the impact. Therefore, the vehicle may obtain the advantages of the fully armored vehicle with less weight when attacked from, for example, only a single direction. Such a secondary armor could be relocated by the disbursement device (or another device) if another portion of the vehicle is attacked. Armor (either secondary or primary) may be, for example, Kevlar or any type of metal or composite.

As stated previously, damage (or impacts) on a particular side or area of a vehicle may cause that vehicle to operate differently. For example, if impacts (damage) is sensed near a sensitive, operation critical component (e.g., a fuel tank) then the autonomous vehicle may sense such impacts/damage and turn/move in such a manner that the sensitive components are out of the line of sight of any aggressor (such that non-critical components are impacted/damaged).

From the foregoing description, persons skilled in the art will recognize that this invention provides impact detection and vehicle cooperation to achieve particular goals and determine particular threat levels. In addition, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A land-based vehicle for carrying a person comprising:
   a first portion, wherein a first impact on said first portion is operable to be detected by said vehicle, wherein said first impact is determined to be a first threat and a first movement of said vehicle is autonomously performed; and
   a second portion, wherein a second impact on said second portion is operable to be detected by said vehicle, wherein said second impact is determined to be a second threat and a second movement of said vehicle is autonomously performed, said first movement and said second movement are different, and said first movement or said second movement changes the location of said vehicle.

2. The vehicle of claim 1, further comprising:
   a first wheel;
   a second wheel;
   a third wheel;
   a fourth wheel; and
   a receiver operable to receive cellular communications, wherein said vehicle is operable to accommodate at least a driver and a passenger.

3. The vehicle of claim 1, further comprising:
   a first wheel;
   a second wheel;
   a third wheel;
   a fourth wheel; and
   a location sensor operable to provide location information, wherein said vehicle is operable to accommodate at least a driver and a passenger.

4. The vehicle of claim 1, further comprising:
   a first wheel;
   a second wheel;
   a third wheel;
   a fourth wheel; and
   detection sensors operable to detect an object, wherein said vehicle is operable to accommodate at least a driver and a passenger.

5. The vehicle of claim 1, further comprising:
   a first wheel;
   a second wheel;
   a third wheel;
   a fourth wheel; and
   a camera operable to detect an object, wherein said vehicle is operable to accommodate at least a driver and a passenger.

6. The vehicle of claim 1, further comprising:
   a first wheel;
   a second wheel;
   a third wheel;
   a fourth wheel; and
   at least one manual input for manual override of said vehicle, wherein said vehicle is operable to accommodate at least a driver and a passenger.

7. The vehicle of claim 1, further comprising:
   a first wheel;
   a second wheel;
   a third wheel;
   a fourth wheel;
   a receiver operable to receive wireless communications;
   a display;

at least one detection sensor; and at least one video camera, wherein said vehicle is operable to accommodate at least a driver and a passenger.

8. The vehicle of claim 1, wherein said vehicle is operable to accommodate at least three people.

9. The vehicle of claim 1, wherein said vehicle is operable to accommodate at least two people and at least two people are operable to manually control said vehicle.

10. The vehicle of claim 1, further comprising a temperature sensor.

11. The vehicle of claim 1, further comprising a plurality of wheels and is operable to carry at least one person and said first movement is driving in a first direction and said second movement is driving in a second direction.

12. The vehicle of claim 1, further comprising a wind detector.

13. The vehicle of claim 1, wherein said first movement is performed with respect to a location of a second vehicle.

14. The vehicle of claim 1, further comprising radar.

15. The vehicle of claim 1, further comprising a metal sensor.

16. The vehicle of claim 1, wherein wireless signals are operable to be received and said wireless signals include data signals and voice signals.

17. The vehicle of claim 1, further comprising:

a first wheel;

a second wheel;

a third wheel; and a fourth wheel, wherein said vehicle is operable to accommodate at least a driver and a passenger and wireless signals are operable to be received and said wireless signals include data signals and voice signals.

18. The vehicle of claim 1, further comprising:

a first wheel; and a second wheel;

a video camera;

a display; and a location sensor, wherein said vehicle is operable to accommodate at least a driver and wireless signals are operable to be received and said wireless signals include data signals.

* * * * *